United States Patent [19]
Shmuelli

[11] Patent Number: 5,993,288
[45] Date of Patent: Nov. 30, 1999

[54] UNIVERSAL BEEHIVE SUPPORT AND BEEHIVE CONSTRUCTION

[76] Inventor: Ellihou Shmuelli, P.O. Box 412, Talmei Yechiel, Elliahu, Israel, 79810

[21] Appl. No.: 08/776,762

[22] PCT Filed: Jun. 5, 1996

[86] PCT No.: PCT/IL96/00003
§ 371 Date: Jul. 31, 1997
§ 102(e) Date: Jul. 31, 1997

[87] PCT Pub. No.: WO96/41519
PCT Pub. Date: Dec. 27, 1996

[30] Foreign Application Priority Data

Jun. 8, 1995 [IL] Israel ......................................... 114074

[51] Int. Cl.⁶ .................................................. A01K 47/00
[52] U.S. Cl. .............................................. 449/26; 449/50
[58] Field of Search .................................. 449/26, 50, 61, 449/64

[56] References Cited

U.S. PATENT DOCUMENTS

| | | |
|---|---|---|
| 2,036,113 | 3/1936 | Befera . |
| 4,375,113 | 3/1983 | Ewert ........................................ 449/61 |
| 4,722,106 | 2/1988 | Scegiel et al. ............................ 449/61 |

FOREIGN PATENT DOCUMENTS

| | | |
|---|---|---|
| 2373965 | 7/1978 | France . |
| 2405645 | 5/1979 | France . |
| 1436958 | 11/1988 | U.S.S.R. . |

*Primary Examiner*—Robert P. Swiatek
*Attorney, Agent, or Firm*—Evenson, McKeown, Edwards & Lenahan, P.L.L.C.

[57] ABSTRACT

A beehive support structure has a lowermost section forming a nest floor which is supported so that it can be slid out. Above the lowermost section, the structure is adapted to support one or more honey floors. The frame-support structure can be adjusted as regards various geometric parameters, such as width, depth and height, of the various floors.

10 Claims, 8 Drawing Sheets

UNIVERSAL BEEHIVE SUPPORT AND BEEHIVE CONSTRUCTION

FIELD OF THE INVENTION

The present invention relates to bee keeping generally, and, more particularly, to beehive structures.

BACKGROUND OF THE INVENTION

Many beehives in commercial use comprise a plurality of generally square or rectangular-shaped, hollow, box-like compartments or "floors", which are manufactured for modular stacking in a tower arrangement. Typically, the bottom most compartment is the "nest floor" where the queen bee resides and in which procreation occurs. This compartment is closed only at the bottom, and is open at the top. One or more upper compartments, known as "honey floors", and having neither a floor nor a ceiling, are arranged above the nest floor so as to be contiguous therewith. Depending on the size of the nest, the amount of honey being produced, and the time of year, the number of honey floors may be either increased or reduced.

In the specification and claims, the term "commercial beehive" refers to the type described above.

From time to time, it may be necessary to access the nest floor for periodic treatments, or to replace it completely. In accordance with the prior art, in order to gain access to the nest floor all of the honey floors must be removed. This, of course, causes great disturbance to the beehive activity.

It is also noted that, while commercial beehives are generally of similar construction, their width, height and length dimensions may differ from region to region.

SUMMARY OF THE INVENTION

The present invention provides a universal beehive support structure for supporting all the floors of a commercial beehive of substantially any size so as to facilitate convenient access to the nest floor for treatment or removal thereof, without requiring prior removal or other substantial disturbance, of the honey floors.

There is thus provided, in accordance with a preferred embodiment of the present invention, a universal beehive support structure for supporting on a support surface a beehive having a nest floor having a selected number of honey floors, wherein the support assembly includes a base assembly, width adjustable means, and height adjustable means. The base assembly includes a support for the beehive on a support surface, and length adjustable means, mounted onto the base, for support and lengthwise engagement of the nest floor; the width adjustable means are associated with the base assembly, and provided for widthwise engagement of the nest floor; and the height adjustable means are associated with the base assembly, and provided for height positioning in accordance with the height of the nest floor.

According to a preferred embodiment of the invention, the base assembly also includes a support permitting selectable transverse positioning of the nest floor with respect to the base.

According to a preferred embodiment, the adjustable support includes a horizontal track associated with the base assembly.

According to a preferred embodiment, the height adjustable means include an upper support for supporting a stack of honey floors in vertical registration with the nest floor.

The base apparatus can include a plurality of base members for supporting the nest floor on a support surface, and a plurality of vertical track members associated with the base members; and the upper apparatus includes an upper support slidably mounted onto the vertical track members, thereby to constitute the height adjustable means, and means for selectably locking the upper support in a vertical position along the vertical track members.

BRIEF DESCRIPTION OF THE DRAWINGS

The present invention will be more fully understood from the following detailed description, taken in conjunction with the drawings, in which.

DETAILED DESCRIPTION OF A PREFERRED EMBODIMENT

Figure 1:
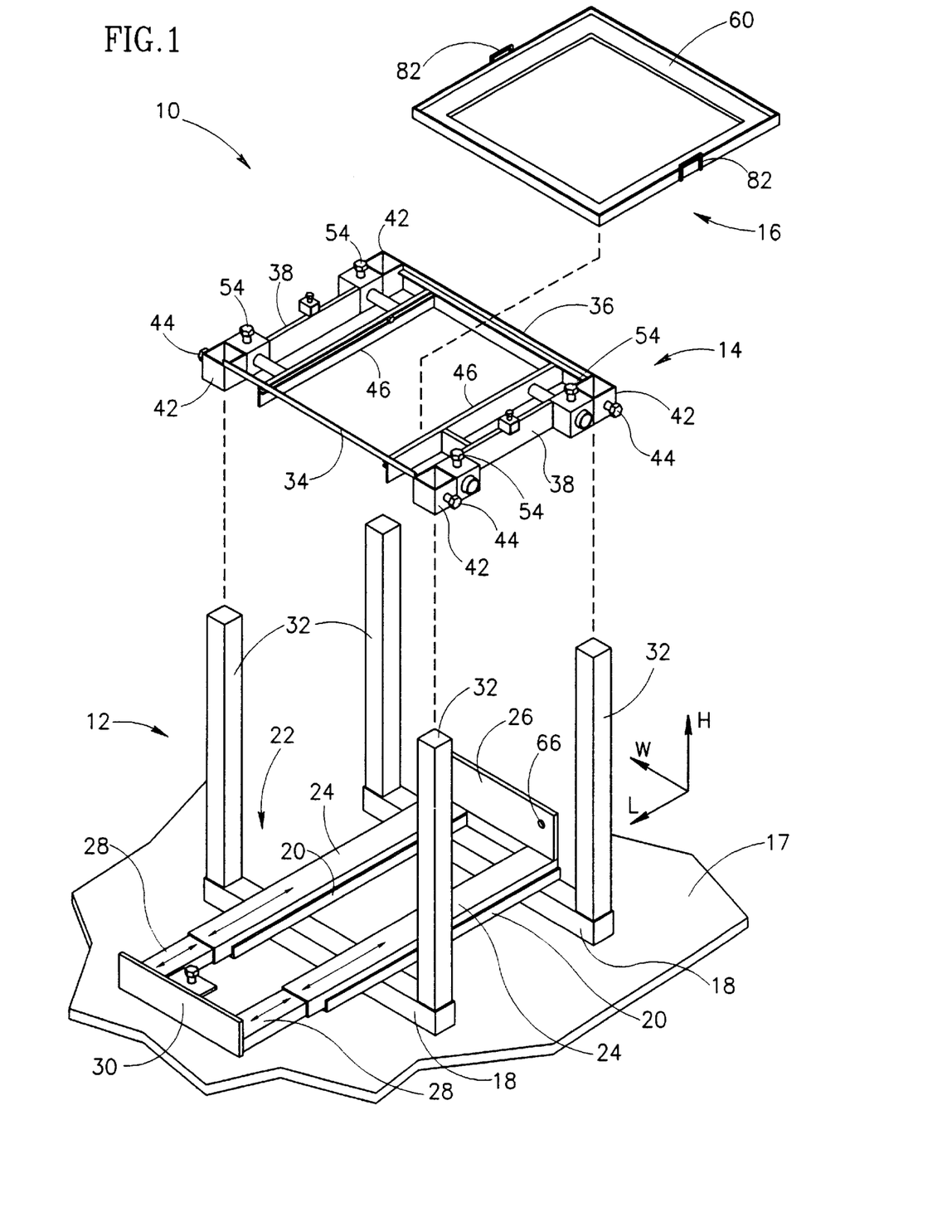
FIG. 1 is an exploded view of the universal beehive support structure of the present invention, in which are seen a length adjustable base assembly, a height and width adjustable upper support assembly, and a removable support.

FIG. 1, shows a universal beehive support structure, 10. Structure 10 includes a base 12, a height and width adjustable upper support 14, and a removable support 16 having a frame 60 and handles 82. The dimensions "length", "width", and "height" as applied to the overall structure 10 and a commercial beehive are defined as indicated in FIG. 1 by the arrows marked "L", "W", and "H", and apply throughout the description and claims.

As seen, base assembly 12 has a rigid base which is supported by surface 17. Base assembly 12 comprises by a pair of spaced apart, generally parallel base members 18 onto which are mounted a pair of transversely arranged, parallel tracks 20. A length adjustable telescopic base structure 22 is constituted by a pair of primary members 24 mounted for sliding motion along tracks 20; a rear plate 26 connected to primary members 24; a pair of secondary, telescopic members 28 arranged for sliding motion within primary members 24; and a front plate 30 connected to telescopic members 28. The base assembly is mounted onto tracks 20 for selectable sliding movement therealong, and, further, is telescopically adjustable so as to fit the length dimension of the nest floor of a commercial beehive.

The base assembly is constructed so as to have the largest size, and the base assembly is wider and longer than the largest commercial beehive. The beehive is supported on a support surface over a greater area than the area of the beehive itself. Support structure 10 provides greater stability than commercial beehives.

Figure 2:
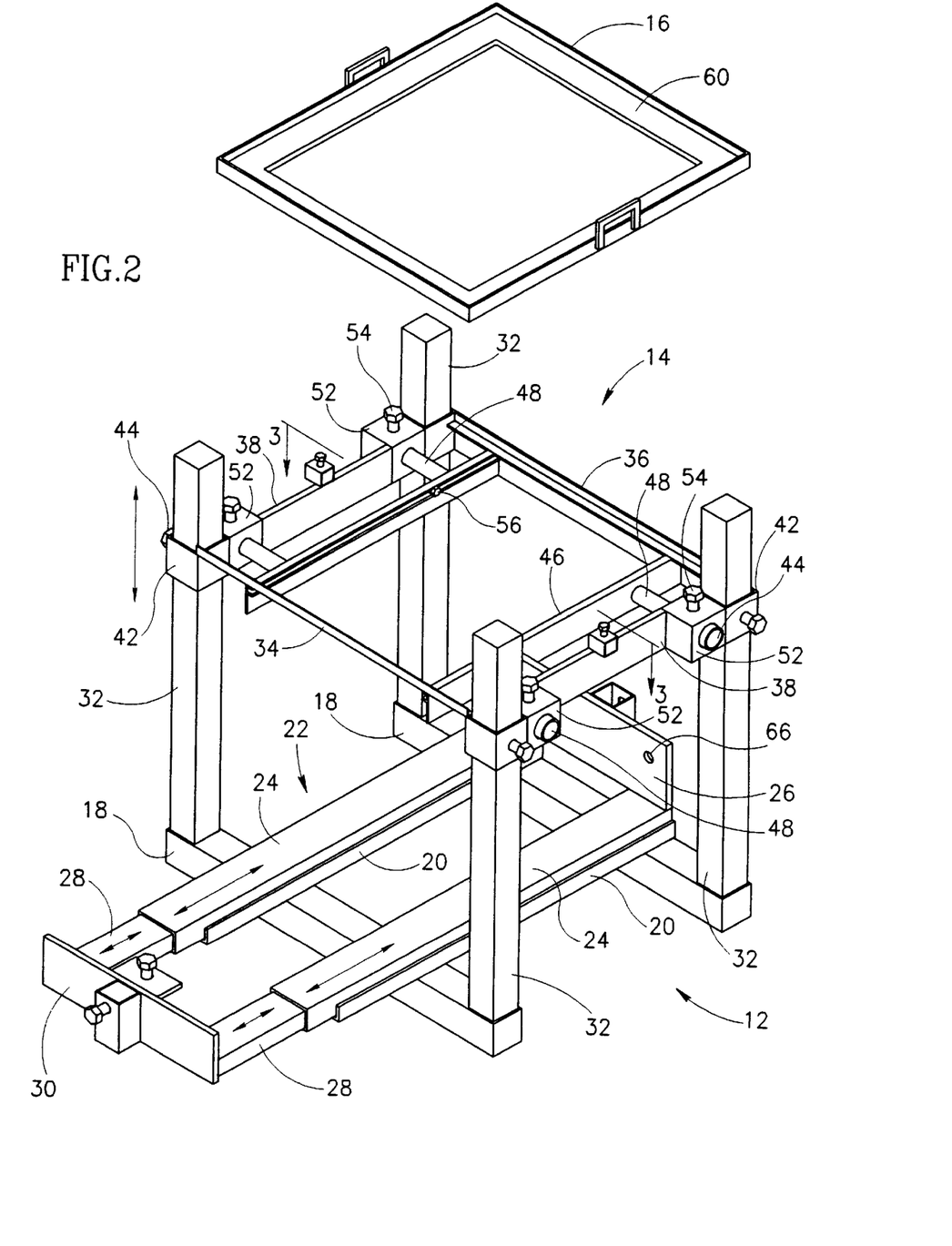
FIG. 2 is a perspective view of the base assembly and upper support assembly seen in FIG. 1.

As shown in FIG. 2, base assembly 12 has a plurality of parallel rigid post members 32 attached to base members 18, and extending upwardly at right angles therefrom, constituting vertical track means for the upper support assembly 14. Post members 32 are spaced apart so as to define width and length dimensions that are at least as great as the width and length of the largest known commercial beehive, and, further, post members 32 have a height large enough to accommodate the nest floor of the largest known commercial beehive.

The base assembly 12 and support assembly 14 are large enough to accommodate the largest known commercial beehive, and are adjustable so as to accommodate the smallest known commercial beehive. Typical dimensions of commercial beehives are: width—42–60 cm; length—approximately 51 cm; height—32–60 cm.

Upper support assembly 14 has front and rear edge members, 34 and 36, and a pair of parallel side members 38. Members 34, 36 and 38 are rigidly interconnected by corner members 42, which are hollow, whose internal configuration is similar to the external configuration of post members 32, thereby facilitating sliding adjustment of the entire upper support assembly 14 along the post members 32. A thumbscrew 44, or equivalent thereof, is provided at each corner member 42, thereby to facilitate selectable locking of upper support assembly 14 along post members 32, thereby also to permit adjustment of the height of the upper support assembly 14 relative to tracks 18, in accordance with the height of a nest floor supported on base assembly 12.

Figure 3A:
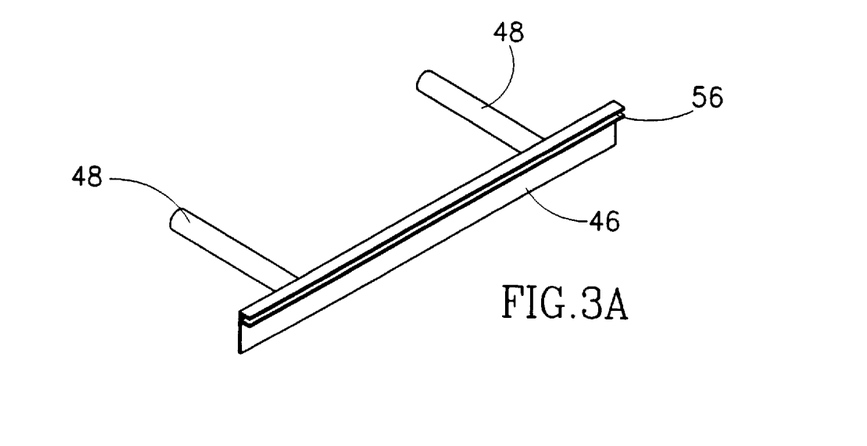
FIG. 3A is a pictorial illustration of a ruler member forming part of the upper support assembly of FIG. 2.
Figure 3B:
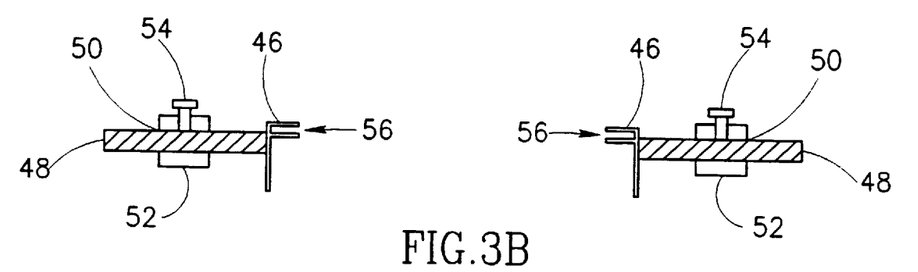
FIGS. 3B and 3C are cross-sectional illustrations of the pair of ruler members of FIG. 2, taken along 3—3 therein fully retracted and fully extended positions, respectively.
Figure 3C:
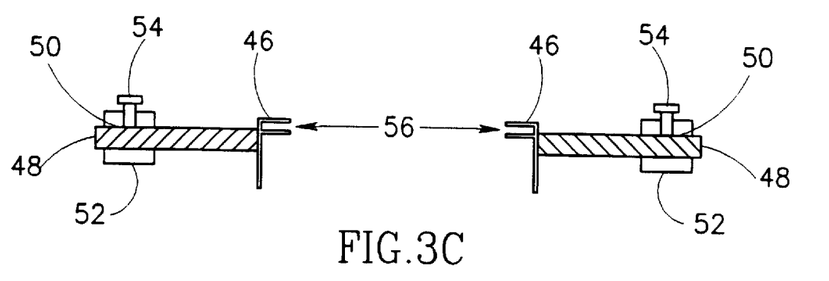

Referring now to FIGS. 3A, 3B and 3C, upper support assembly 14 includes a pair of straight "ruler" members, 46. Each ruler member 46 is adjustably mounted onto a side member 38 so as to be parallel thereto. Each ruler has a pair of rod portions 48 protruding rearwardly therefrom, which extend through bores 50 (FIGS. 3B and 3C) formed in mountings 52 attached to side member 38. A thumbscrew 54, or equivalent thereof, is provided in association with each mounting 52 for selectable locking engagement of rod portions 48 of ruler members 46, once the ruler members have been slidably adjusted to a selected position.

Each ruler 46 has formed thereon a track portion 56 which, when the pair of ruler members are in position, as seen in FIGS. 2, 30 and 3C, faces inwardly, towards the opposite track portion. Track portions 56 together enable sliding insertion and removal of a planar accessory 58 (FIG. 6), such as a Honeyman™ or Porter™. While the ruler members 46 do not support any portion of the beehive, they nonetheless facilitate accommodation of technical accessories which are adapted to the width of the beehive, and, further, prevent escape of bees through gaps which would otherwise remain between the top of the nest floor and the bottom of the honey floor immediately adjacent thereto.

There is also provided a T-shaped closure member. This member 61 has a stem portion extending at right angles from a base portion and, in the absence of an accessory 58 (FIG. 6), it is inserted through a gap between the top of the nest floor and the bottom of the honey floor immediately adjacent thereto so as to engage track portions 56 of the ruler members 46, at right angles. The base portion of the closure member is wide enough so as to completely cover the gap to prevent escape of bees therethrough.

Due to the weight of beehives, especially of the honey floors thereof, the structure of the present invention is to be able to support loads of up to 200 kg, for example. Accordingly, the load-bearing components are preferably formed of high strength materials, such as steel.

FIGS. 4A–6, installation of a commercial beehive is described.

Figure 4A:
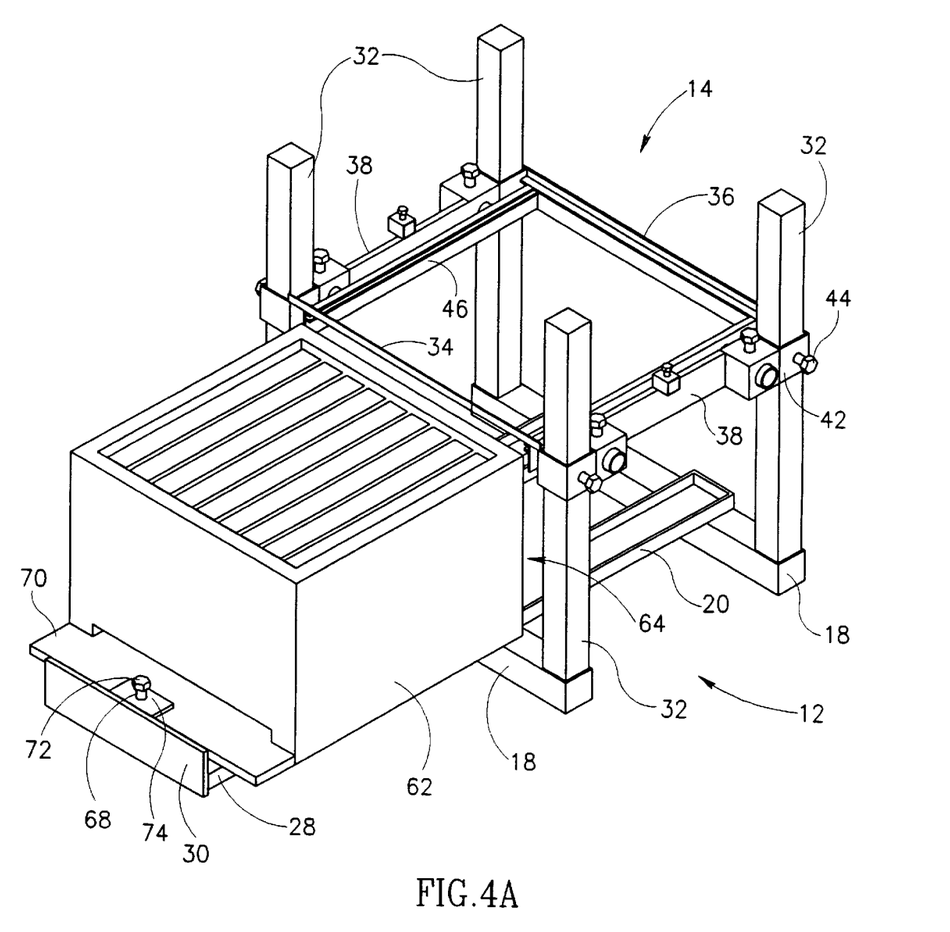
FIGS. 4A and 4B are perspective views of a nest floor in respective extended and retracted positions in the support structure of the invention.
Figure 4B:
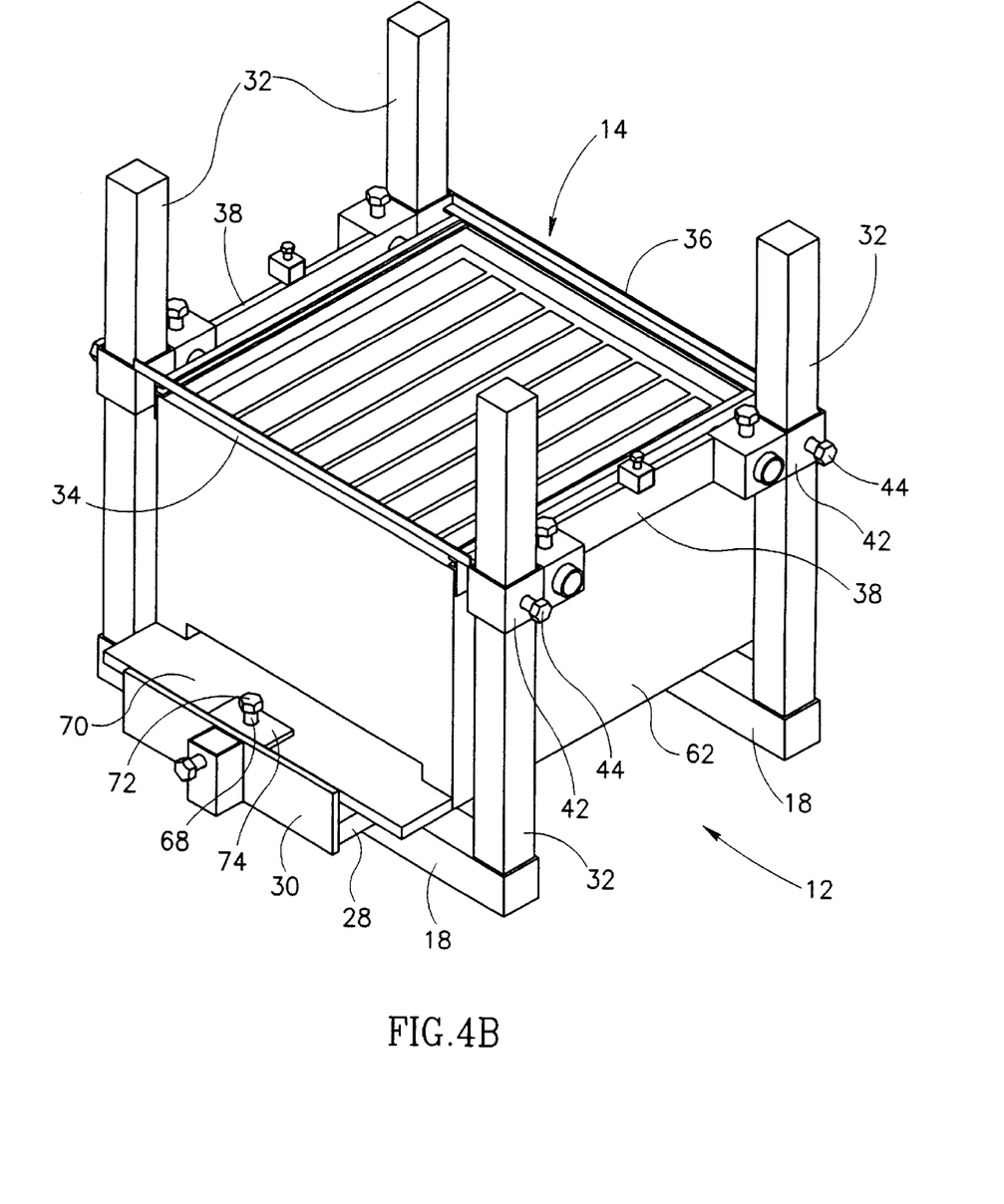

Initially, telescopic base assembly 22 of base assembly 12 is completely extended, to the position seen in FIGS. 1 and 2, so as to enable positioning thereon of the nest floor 62 of a commercial beehive. The nest floor 62 is placed on telescopic assembly 22. Subsequently, telescopic assembly 22 is retracted so that nest floor 62 becomes clamped between front plate 30 and rear plate 26. As seen in FIGS. 1 and 2, rear plate 26 has a pair of bores 66 formed therein. These bores are used to facilitate fastening of the rear plate 26 to a rear wall 64 of nest floor 62, by the insertion through the bores 66 of a pair of screws. Similarly, a screw 72 has a shank 68 which is inserted through a bore provided in an inward-facing transverse flange 74 so as to engage the threshold 70 of the nest floor 62. Thus nest floor 62 is securely mounted onto telescopic base assembly 22 and may be slidably moved along tracks 20 in drawer-like fashion. Subsequently, nest floor 62 is slidably retracted into the space between the four post members 32, as seen in FIG. 4B.

Figure 5:
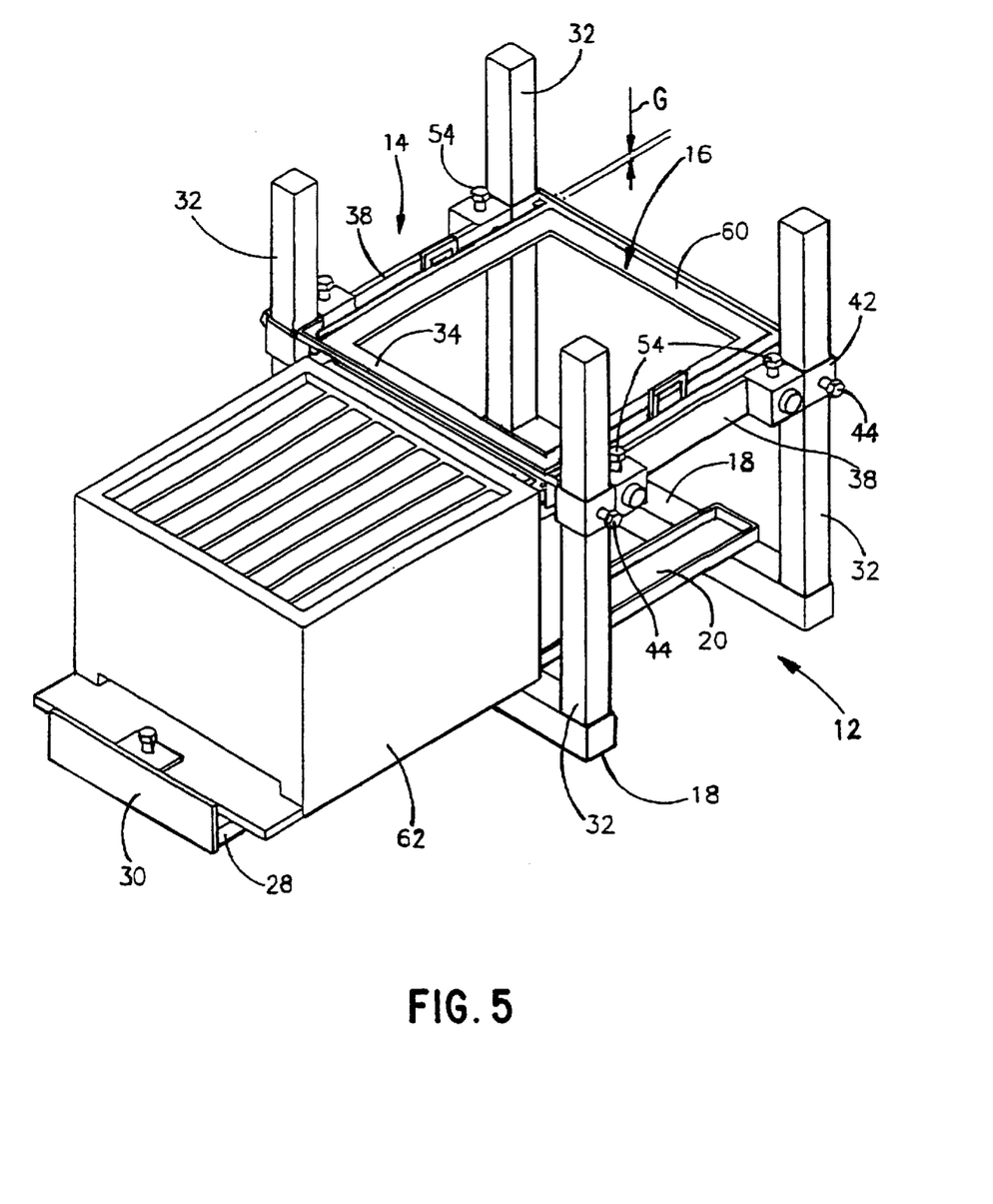
FIG. 5 is a view similar to that of FIG. 4A, but also showing the removable support in position on the upper support assembly.

Once the structure 10 has been adjusted so as to accommodate the length of the nest floor 62, as described, it is necessary to provide height and width adjustment, as described below in conjunction with FIG. 5.

Height adjustment is provided by loosening the thumbscrews 44 which, when tightened, provide vertical locking of upper support assembly 14 along post members 32. Subsequent to the loosening of the thumbscrews 44, the upper support assembly 14 is lowered toward nest floor 62. Upper support assembly 14 is positioned such that a small gap "G" remains between the top of the nest floor 62 and the support assembly 14. This gap is required so as to prevent the nest floor 62 from "sticking" when it is sought to extend it in drawer-like fashion from the remainder of the construction. The gap must not, however, be so great that the queen bee can escape therethrough. Accordingly, it is preferably in the range 1–4 mm.

Figure 6:
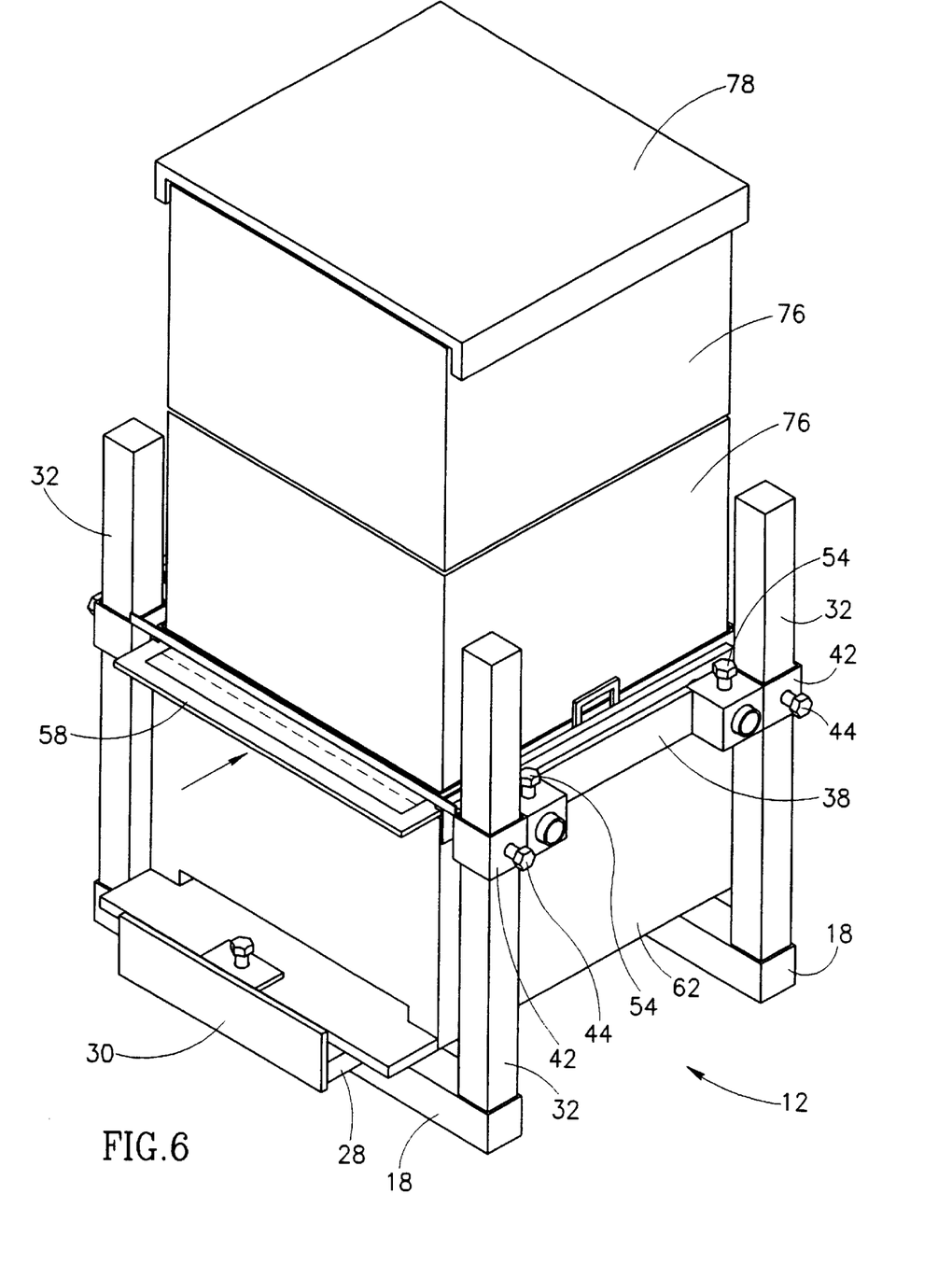
FIG. 6 is a perspective view of a beehive construction according to the present invention, showing sliding insertion/removal of an accessory between the nest and honey floors.

After setting the height, it is necessary to set the width of the support structure 10, by adjusting the spacing between the ruler members 46, thereby not only blocking gaps between the nest floor and the immediately adjacent honey floor, but also so as to enable insertion of a generally planar accessory 58, shown in FIG. 6, whose width is similar to that of the beehive. Adjustment of the rulers 46 is provided by loosening the thumbscrews 54, to permit rulers 46 to be slidably adjusted to any selected position between the two extreme positions seen in FIGS. 3B and 3C. Once ruler members 46 have been adjusted, they can be locked once again, thereby enabling insertion and removal of accessory 58, as required.

Ruler members 46 obviate the prior art necessity of having to remove the honey floors of the beehive in order to remove a technical accessory from between or insert between the nest floor and the honey floors.

Subsequently, the removable support 16 is placed in position on the upper support assembly, and the honey floors, referenced 76 (FIG. 6), may then be mounted onto the support 16. A cover 78 is placed on top of the top honey floor 76.

All the honey floors 76, may be bound together by passing a suitable wire elongate flexible member through a pair of provided on the removable support, thus providing increased mechanical stability to the entire beehive.

A main characteristic of the support structure of the invention is its adjustability to any size of commercial beehive.

Figure 7:
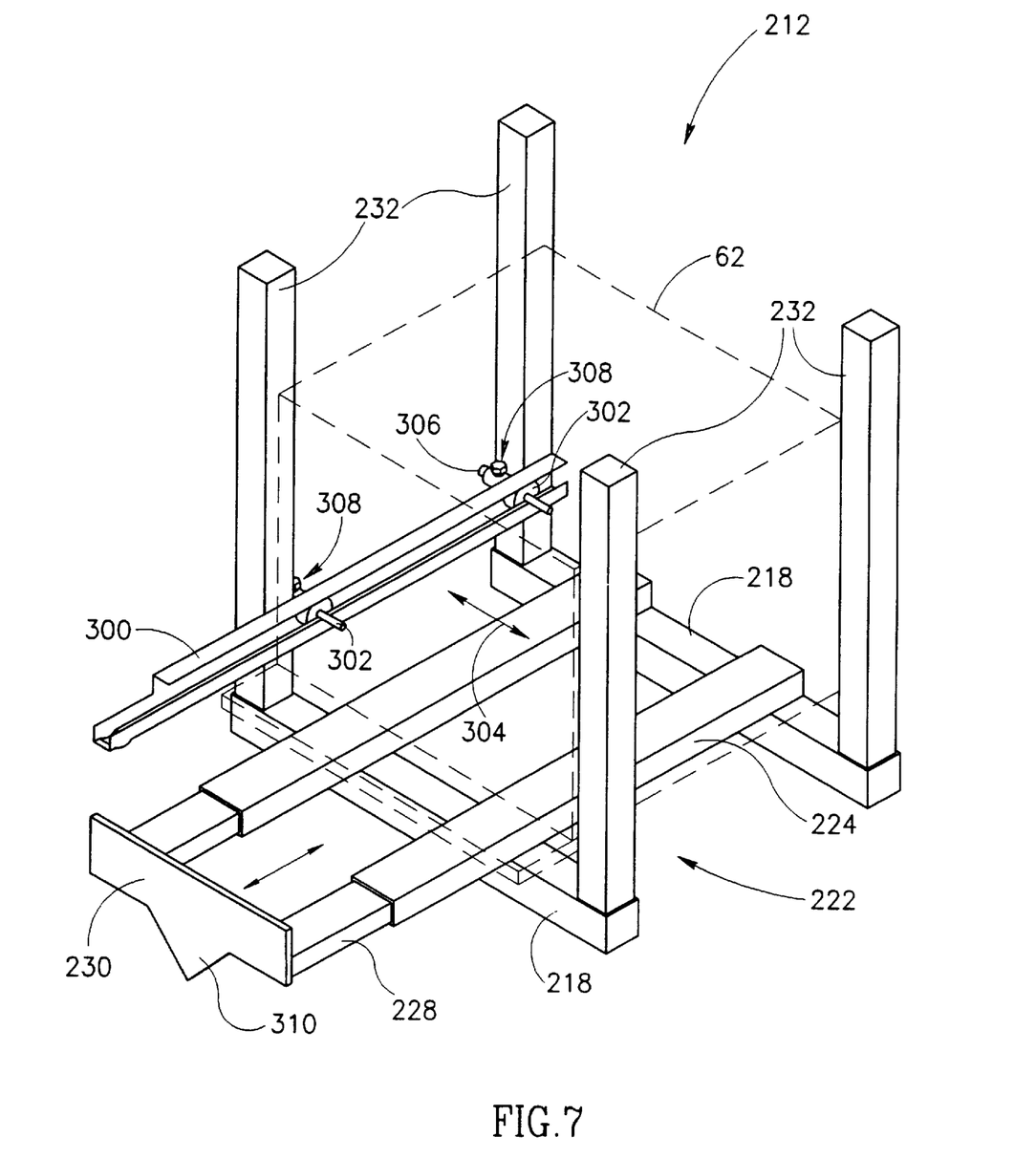
FIG. 7 is a schematic view of a base assembly constructed in accordance with a further embodiment of the invention.

Referring now to FIG. 7, there is also provided, in accordance with a further embodiment of the invention, a base assembly 212 which may be used in conjunction with either of the types of upper support assemblies shown and described hereinabove. The overall layout of base assembly 212 is similar to that described, in conjunction with FIGS. 1 and 2. Accordingly, components common to both the present base assembly 212 and the above-described base assembly 12 are denoted by similar reference numerals, but with the addition of a "2" prefix, and are described again only insofar as may be necessary to understand the present embodiment.

Primary members 224 of telescopic, length adjustable base assembly 222 are connected directly to base members 218. One or more horizontal track member, referenced 300, (only a single one being shown in the drawing), are provided for facilitating extension and retraction of a nest floor 62 (shown in broken lines). Track member 300 is mounted onto vertical posts 232, and nest floor 62 is slidably engaged therewith via rollers 302 or any other suitable mounting means. Track member 300 is preferably laterally adjustable, as indicated by double headed arrow 304, via rear rod-like protrusions 306 and thumbscrew fittings 308 fastened to posts 232, thereby facilitating width adjustment of the base assembly.

In the present embodiment, front plate 230 is provided with a downward extension 310, which prevents forward tipping of the complete beehive and support structure when nest floor 62 is extended and there is an insufficient counterweight provided against tipping by the honey floors located above. Extension 310, or an equivalent support leg, for example, may also be provided in conjunction with any of the other embodiments of the invention.

In order to slide out drawer of the nest floor, which may adhere to the structure above it by materials produced by the bees, means are provide to detach the drawer from the frame of the honey floor above it.

It will be appreciated by persons skilled in the art that the present invention is not limited by what has been shown and described hereinabove, merely by way of illustrative example. Rather, the scope of the present invention is limited solely by the claims, which follow:

I claim:

1. A universal beehive support structure for supporting, on a support surface, a beehive having a nest floor and a plurality of honey floors, said support structure comprising:
    a base structure for supporting said beehive, and length adjustable rails mounted onto said base structure for support and lengthwise engagement of said nest floor;
    width adjustable seating, associated with said base structure, for widthwise engagement of said nest floor; and
    a height adjustable frame, associated with said base structure, for engagement of said beehive at a desired height above said length adjustable rails.

2. A beehive support structure according to claim 1, wherein said base structure includes adjustable support means permitting selectable transverse positioning of said nest floor with respect to said base structure.

3. A beehive support structure according to claim 2, wherein said adjustable support means comprises horizontal track means associated with said base structure so as to provide lateral sliding support to said nest floor, and further comprising means for mounting said nest floor onto said horizontal track means.

4. A beehive support structure according to claim 1, wherein said nest floor has a rear portion and a front portion spaced apart from the rear portion by a length of said nest floor, and wherein said length adjustable rails comprise rear means for engaging the rear portion of said nest floor, front means for engaging the front portion of said nest floor, and telescopic means, connected between said rear means and said front means, disposed so as to enable engagement between the front means and the rear means of said nest floor having a selected length, and wherein said height adjustable frame comprises an upper support assembly for supporting a stack of honey floors in vertical registration with said nest floor.

5. A beehive support structure according to claim 4, wherein said width adjustable seating comprises a pair of straight members mounted onto said height adjustable frame, parallel to side walls of said beehive spaced apart across a width thereof, and means for adjusting a lateral spacing between said straight members in accordance with the width of said beehive.

6. A beehive support structure according to claim 5, wherein said straight members have formed therein track means for slidable mounting of a generally planar accessory above said nest floor.

7. A beehive construction comprising:
    a beehive having a nest floor, having length, width and height dimensions, and having a plurality of honey floors; and
    a universal support structure which comprises:
        a) a base structure for supporting said beehive, and length adjustable rails mounted onto said base structure for support and lengthwise engagement of said nest floor;
        b) width adjustable seating, associated with said base structure, for widthwise engagement of said nest floor; and
        c) a height adjustable frame, associated with said base structure, for engagement of said beehive at a desired height above said length adjustable rails in accordance with a height of said nest floor.

8. A beehive construction according to claim 7, wherein said height adjustable frame further comprises upper support means for supporting a stack of honey floors in vertical registration with said nest floor and wherein vertical track members are connected to said base structure and are spaced apart by a distance greater than a width of said nest floor.

9. A beehive construction according to claim 7, wherein said base structure further includes adjustable support means permitting selectable transverse positioning of said nest floor with respect to said base structure, said adjustable support means comprising horizontal track means associated with said base structure, and wherein said horizontal track means is disposed between said base structure and said length adjustable rails.

10. A beehive construction according to claim 9, wherein said horizontal track means is mounted onto said base structure so as to provide lateral sliding support to said nest floor, and wherein said base structure further includes mans for mounting said nest floor onto said horizontal track means.

* * * * *